April 18, 1961 W. T. RENTSCHLER 2,980,005
PHOTOGRAPHIC CAMERA
Filed Jan. 21, 1958 3 Sheets-Sheet 1

INVENTOR.
Waldemar T. Rentschler
BY
Munn, Liddy, Daniels & March
ATTORNEYS

April 18, 1961 W. T. RENTSCHLER 2,980,005
PHOTOGRAPHIC CAMERA
Filed Jan. 21, 1958 3 Sheets-Sheet 2
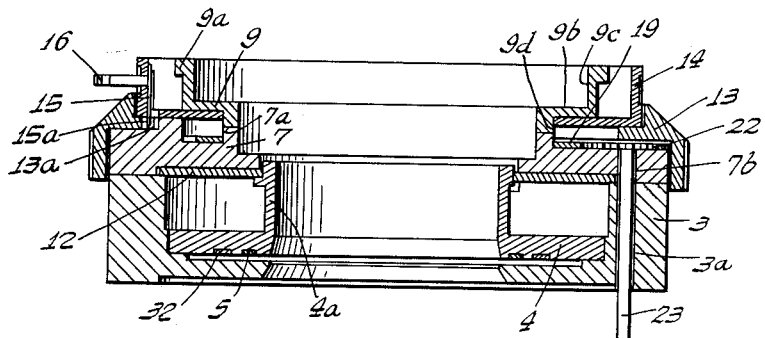
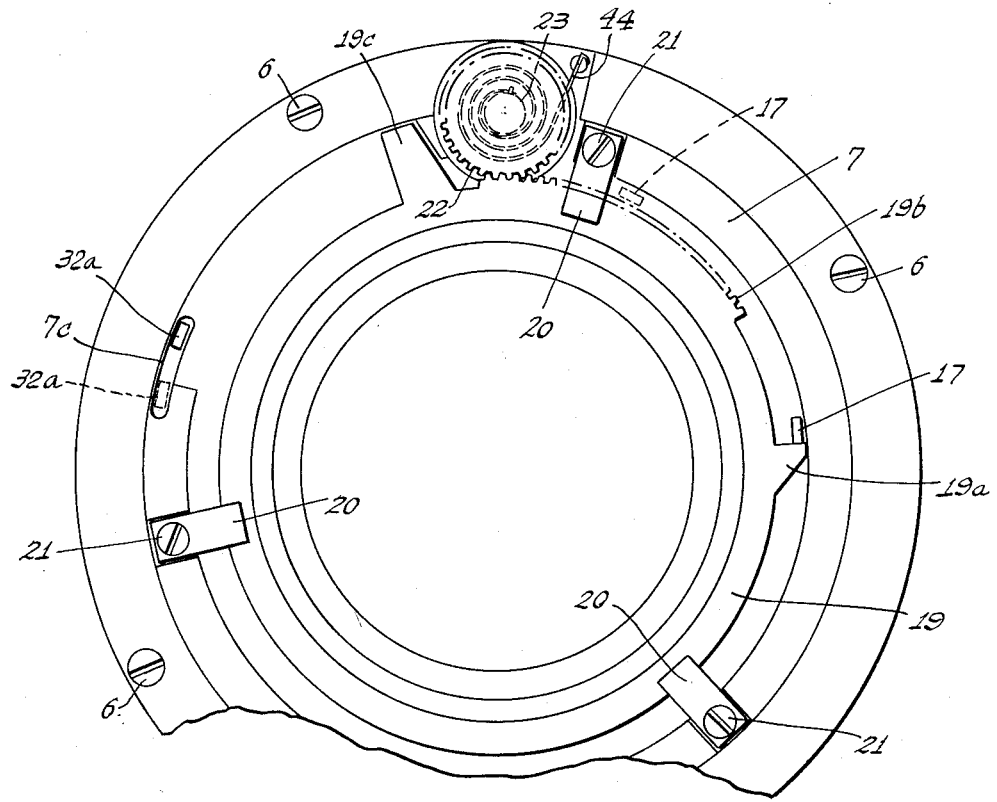
INVENTOR.
Waldemar T. Rentschler
BY
Munn, Liddy, Daniels & March April 18, 1961 W. T. RENTSCHLER 2,980,005
PHOTOGRAPHIC CAMERA
Filed Jan. 21, 1958 3 Sheets-Sheet 3
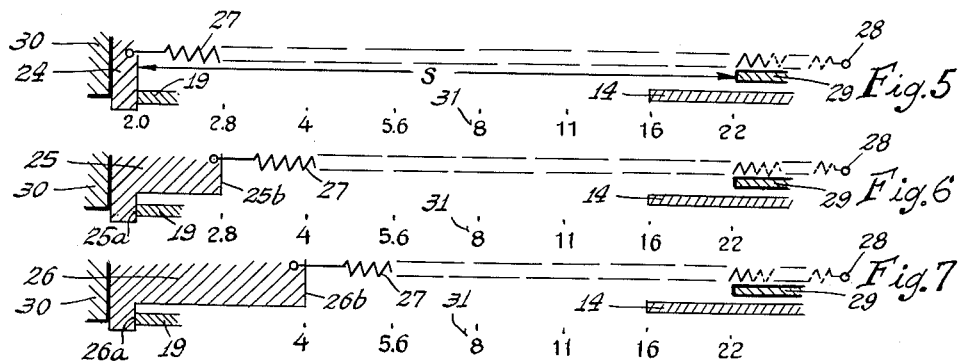
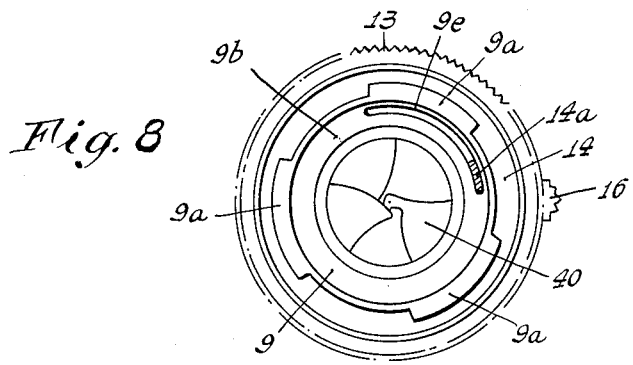
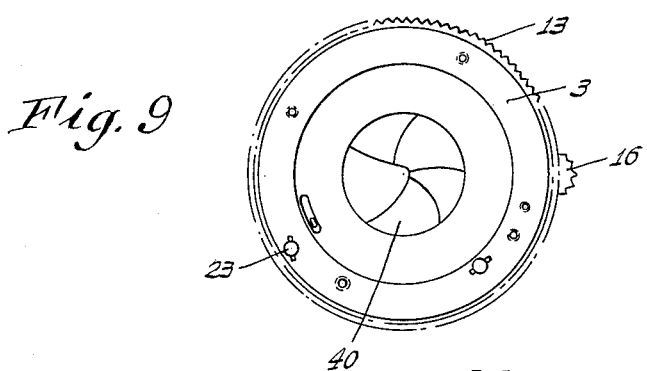
INVENTOR.
Waldemar T. Rentschler
BY
Munn, Liddy, Daniels & March
ATTORNEYS

United States Patent Office 2,980,005
Patented Apr. 18, 1961

2,980,005

PHOTOGRAPHIC CAMERA

Waldemar T. Rentschler, Calmbach (Enz), Germany, assignor to Alfred Gauthier G.m.b.H., Calmbach (Enz), Germany, a corporation of Germany Filed Jan. 21, 1958, Ser. No. 710,280

Claims priority, application Germany Jan. 24, 1957

13 Claims. (Cl. 95—64)

This invention relates to photographic cameras, especially cameras having interchangeable lens assemblies incorporating built-in diaphragms, as for example single-lens reflex cameras of this type.

The present application corresponds to my copending German application Serial No. G21,349 IX/57a, filed January 24, 1957, and entitled Photographic Camera, and priority is claimed for the present invention, based on this prior-filed German application.

In cameras of the above type a well-known construction employs a spring which acts on the diaphragm mechanism of the interchangeable lens assembly, to urge the mechanism to an extreme setting wherein the diaphragm aperture has its smallest value. The diaphragm mechanism or diaphragm operator has a coupling portion, as for example a lug, pin or arm, which is under the action of the spring for the diaphragm and which cooperates with a stop, as by an abutting driving connection therewith, which stop is connected to a transmission or diaphragm setting ring carried by the camera or shutter housing and concentrically disposed with respect to the optical axis. By the provision of a releasable coupling device, the transmission or diaphragm setting ring may be coupled with the speed setting member of the shutter, for simultaneous movement therewith.

Cameras of the above type have a number of desirable features and advantages. For example, by virtue of the driving connection established between the diaphragm operator of the interchangeable lens assembly and the transmission or diaphragm setting ring on the shutter or camera, there is effected a desirable coupling between the diaphragm and speed mechanisms which simplifies and renders more accurate the operation of the camera, and finds advantage as well in the camera structure. A particular benefit is had when interchanging the lens assemblies, since the speed-diaphragm proportion which was previously established is not disturbed during the change-over process. By virtue of such connection being arranged to utilize a spring-biased part between the diaphragm mechanism and transmission or diaphragm setting ring, it is not necessary for the operator to be concerned with the establishing of this connection since the same will be automatically taken care of during the attaching of the interchangeable lens assembly.

In cameras of the above type means have also been provided in the past for adjusting the focus to the proper distance by viewing the object through the picture-taking lens, in conjunction with a focusing screen. With such organization it has also been known to adjust the diaphragm of the lens assembly to provide the largest aperture, whereby the brightest picture is obtained on the focusing screen of the view finder.

An object of the present invention is to provide a novel and improved camera of the above general type, wherein there is incorporated simplified means for effecting the opening of the diaphragm to the largest setting aperture for viewing of the objective, and for effecting subsequent reclosure of the diaphragm prior to taking the picture, said means involving the lowest possible manufacturing cost and imposing no additional burden or operation on the user. Particularly, the means provided by the invention is readily adaptable to cameras wherein the speed and diaphragm mechanisms are coupled with each other.

In accordance with the invention, I accomplish the above objective by the provision of a novel actuation member adapted to drivingly engage the operator or coupling portion of the diaphragm mechanism, in addition to the engagement of such portion by the transmission or diaphragm setting ring of the shutter or camera structure. The said actuation member is thus operative to shift the diaphragm mechanism to its fully opened position independently of the setting ring.

The invention may be carried out by a number of different structures.

By constituting the actuation member as a ring which is concentric with the transmission or diaphragm setting ring, the actuation member may be readily incorporated in or adapted to existing well-known camera and lens structures.

Also, a desirable simplicity and saving of space and cost may be had, by disposing the actuation ring so that it is axially to the rear of the transmission ring carried by the shutter housing.

Such construction is especially simple when the actuation ring is located between on the one hand that part of the detachable mounting means for the lens assemblies which is carried by the shutter housing and on the other hand the speed setting ring or shutter housing cover plate which are concentric with respect to the optical axis.

I further provide a gear train in conjunction with the actuation ring, by which a simple driving connection may be established therewith, such connection being readily adaptable to existing camera structures and having a minimum number of requirements as regards its positioning and manner of being driven.

By the provision of an actuation ring as above set forth, in conjunction with the gear train, a very compact structure is had, which requires but very little space. This is because the gear train may be arranged in the same plane as the actuation ring, behind that part of the detachable mounting on the shutter housing and in front of the speed setting ring or shutter cover plate, which latter are concentric with the optical axis.

Where the camera is of the type having a lens shutter, an advantageous driving connection may be established to the gear train by the provision of a shaft connected therewith, which protrudes from the shutter housing and preferably from the rear wall thereof.

Where lens assemblies are employed having lenses some of which are faster than others, this is taken into account by the present invention, by a novel organization included in the driving connection between the actuation ring and the diaphragm operator, such organization being extremely simple and inexpensive to produce. I utilize a maximum, predetermined extent of travel of the actuation ring, corresponding to the large shifting range of the diaphragm carried by that lens assembly which has the fastest lens. When using assemblies having slower lenses, involving a smaller shifting range of the diaphragm operator, I provide stepped or spaced abutments or surfaces on the coupling portion or lug of the diaphragm operator, for engagement respectively with the actuation ring and the transmission ring carried by the shutter housing.

It has been previously proposed to provide means for opening the shutter independently of the shutter drive mechanism, such means facilitating the viewing of the subject through the picture-taking lenses. In carrying out the present invention, a camera embodying the invention may advantageously employ separate or independent shutter-opening means of this type. A maximum degree of simplicity in the operation of the camera may then be obtained, as well as simplicity of structure by connecting such independent shutter-opening means or device with the actuation ring for simultaneous movement therewith, thereby to cause simultaneous opening of the shutter and enlargement of the diaphragm opening.

In accomplishing the above connection between the independent shutter opening device and the actuation ring, I provide an advantageous and simple structure in the form of an additional ring concentric with the actuation ring, such additional ring and actuation ring having co-engaging or abutting arms to establish a driving connection between the rings. Movement of the actuation ring will then result in driving of the additional ring, to effect opening of the shutter blades independently of the regular shutter drive.

The accompanying drawings illustrate one embodiment of the invention.

Fig. 3 is an axial sectional view of the lens shutter organization of the camera structure of Fig. 1.

Fig. 4 is a fragmentary front elevational view of the shutter organization of Fig. 1, with the speed setting ring, transmission ring, and lens mounting device removed to reveal interior details.

Fig. 5 is a schematic representation of a transmission ring and actuation member carried by the shutter organization, in conjunction with a coupling portion or lug of the diaphragm operator carried by a lens assembly having a fast lens.

Fig. 6 is a view like Fig. 5 but showing the coupling portion or lug of the diaphragm operator of a lens assembly having a slower lens.

Fig. 7 is a view like Figs. 5 and 6 but showing yet another coupling portion or lug of a diaphragm operator of a lens assembly having a still slower lens.

Fig. 8 is a front elevational view of the lens shutter organization of Fig. 1.

Fig. 9 is a rear elevational view of the lens shutter organization of Fig. 8.

Figure 1:
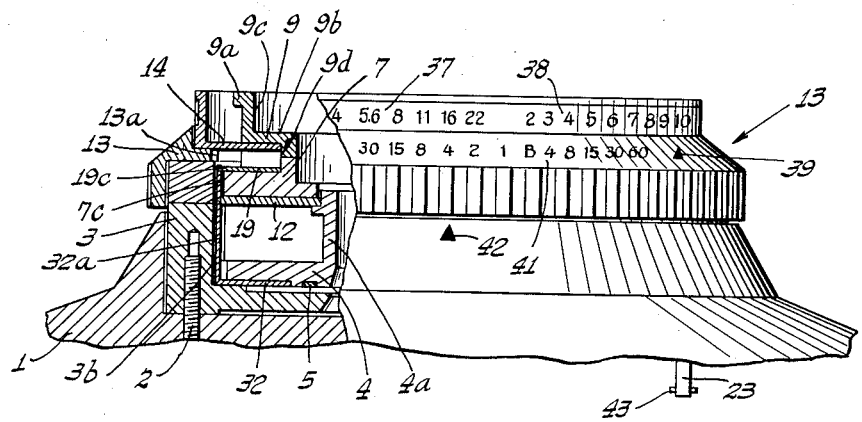
Figure 1 is a view partly in side elevation and partly in axial section, of a front portion of a camera having a lens shutter as provided by the invention.

Referring to Fig. 1, the housing of the photographic camera is indicated at 1. On the housing 1, by means of screws 2 there is mounted a lens shutter organization, having a shutter housing 3 in which there is carried a shutter base plate 4. The base plate 4 serves in the well-known manner for supporting the various parts of a known shutter mechanism which is not drawn for the sake of clarity of illustration. Between the base plate 4 and the bottom or back of the shutter housing 3 there is provided space for the disposition and movement of shutter blades 40 (Figs. 8 and 9) which may be actuated in the well-known manner by means of a shutter blade driving ring 5.

Figure 2:
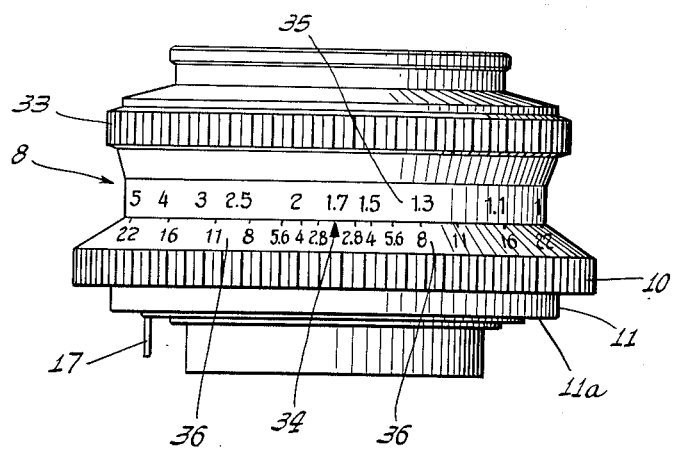
Fig. 2 is a side elevational view of an interchangeable lens assembly adapted to be mounted on the camera structure of Fig. 1.

The front of the shutter housing 3 has a cover plate 7, which is supported in front of the shutter and is secured in place by means of screws 6 (Fig. 4). There is also provided a carrier and supporting ring 9, which constitutes one of the parts for detachably mounting the interchangeable lens assemblies 8 (Fig. 2) having incorporated therein diaphragm mechanisms in the well-known manner. The mounting part or ring 9 positions the lens assemblies and is connected with the cover plate 7 in any suitable manner, as for example by the use of screws.

Cooperable with the mounting ring 9 there is provided on the lens assembly 8 a bayonet ring 10, which is constituted as a rigid or immovable part of said assembly. The bayonet ring 10 cooperates with bayonet lugs 9a of the ring 9, as will be understood, and in attaching the lens assembly 8 the ring 10 is fitted over the ring 9 in accordance with markings provided on the lens asembly and camera. The ring 10 is then turned until a stop or well-known locking device (not drawn) becomes effective. To center the lens assembly on the shutter organization a ring 11 is provided on the assembly, receivable within the side wall 9c of the ring 9. The rear surface 11a of the ring 11 engages the front surface 9b of the ring 9, as will be understood, to axially position the lens assembly.

For adjustment of the shutter speed, there is provided under the mounting plate or ring 9 a speed setting ring 12, which bears on the nozzle 4a of the shutter base plate 4. The ring 12 is connected (by means not shown) with the manually operable speed setting ring 13 which overlies the circumference of the cover plate 7. Such means, for example, could comprise an arm extending through a slot in the side wall of the shutter housing 3. The speed setting ring 13 has a speed scale 41, which includes values automatically controlled by the shutter as well as values not automatically controlled, and said scale is cooperable with a fixed index mark 42 on the camera structure.

The shutter organization also includes a diaphragm setting and transmission ring 14 which bears against a shoulder 9d provided at the rear of the lens-assembly mounting ring 9. The setting ring 14 also serves to releasably couple the diaphragm mechanisms of the interchangeable lens assemblies with the speed setting rings 12 and 13 of the shutter organization, in the following manner. The rings 14 and 13 are connected together by a releasable coupling device, whereas the ring 14 is adapted to cooperate with a coupling portion or lug of the diaphragm mechanism operator of an interchangeable lens assembly when such assembly is mounted on the shutter organization. The coupling device between the transmission ring 14 and the speed setting ring 13 comprises a leaf spring 15 (Fig. 3) which is mounted on the inner circumference of the transmission ring 14. The spring 15 on a movable portion thereof, carries a manually operable handle 16 which extends outward through a slot in the transmission ring 14. The free end of the coupling spring 15 has claws or projections 15a which cooperate with notches 13a provided in the inner circumference of the ring 13. Depressing the handle 16 disengages the claws and notches and releases the rings 13 and 14 for independent movement, and release of the handle 16 again couples the rings 13 and 14.

On the interchangeable lens assembly 8 there is provided a rearwardly extending and projecting arm 17 constituting a part of the operator for the diaphragm mechanism of the lens assembly. The connection of the arm 17 with the diaphragm operator is not shown in detail. When the lens assembly 8 is mounted on the shutter organization of the camera the arm 17 is held, under the action of a spring such as the spring 27 shown in Figs. 5, 6 and 7, against a stop or lug 14a carried by the transmission ring 14. The spring 27 tends to shift the diaphragm mechanism toward one end of its path of travel wherein the smallest diaphragm opening is obtained. For yieldably holding the transmission ring 14 in different selected positions, any well-known notch device or detent may be provided. Such detent is not shown herein. In the illustrated embodiment of the invention the ring 14 is provided with a detent action by coupling it with the rings 13 and 12 and providing detent notches on one of these latter rings. To provide clearance for the rearwardly projecting arm 17 of the lens assembly, the mounting ring 9 has an arcuate slot 9e (Fig. 8) into which the arm extends, to enable it to drivingly engage the stop or lug 14a of the ring 14.

In accordance with the invention I provide a novel and improved means carried by the shutter organization and engageable with the coupling portion (the coupling arm 17) of the diaphragm mechanism of an interchangeable lens assembly to effect actuation of the diaphragm mechanism to fully open position independently of the transmission ring 14, and further permit the use of different types of interchangeable lens assemblies with the same shutter organization.

In order to readily adapt the said actuation member to the shutter organization, such member may be constituted as the ring 19 shown in Figs. 1 and 3. The ring 19 may be advantageously disposed on the shutter organization between the ring 9 and the shutter cover plate 7. Such location involves a space which is concentric with the transmission ring 14 and disposed axially to the rear of said ring. To provide a bearing for the ring 19 the cover plate 7 has a shoulder 7a, Fig. 3, and the ring 19 is held axially by means of radial plates 20 (Fig. 4) which are secured to the cover plate 7 by screws 21.

By the above organization, in accordance with the invention, no additional space is required by the actuation ring 19. Furthermore, the interior of the shutter housing 3 is not required for accommodating additional parts, and the camera structure remains compact. Moreover, such disposition of the actuation ring 19 enables an advantageous cooperation to be established between such ring and a driving member which is to be disposed on the camera body. Finally, such disposition of the actuation ring 19 enables an advantageous connection to be established between the ring and coupling portions or lugs of diaphragm operators of the interchangeable lens assemblies having either fast or slow lenses, as will be shortly described. In the embodiment of the invention illustrated herein the connection or cooperation between the actuation ring 19 and the coupling arm 17 of the diaphragm operator is effected by the provision of a projection 19a (Fig. 4) on the ring 19. When an interchangeable lens assembly is mounted on the shutter organization, the coupling arm 17 is located in the path of travel of the projection 19a.

In many instances it may be desired not to actuate the ring 19 by a separate manual operation but instead to effect such actuation by a device which is carried by the camera and which may carry out other functions, as for example the advancing of the film.

In achieving such coordinated actuation it is desirable to provide the greatest possible freedom and adaptability of the coordinating structure.

In accordance with the invention, the said freedom and adaptability is made possible by the provision of a gear train, which engages the actuation ring 19 for the purpose of driving the latter.

As shown herein, the gear train may consist of a gear 22 rotatably mounted on the shutter housing 3, and a gear segment 19b meshing with the gear 22 and constituting a portion of the ring 19. The gear segment 19b is provided at the exterior circumference of the ring 19, and to effect a saving of space and simplicity of construction, the gear 22 is disposed between the mounting ring 9 and the shutter cover plate 7, in the same plane as the actuation ring 19. For the purpose of driving the gear 22, the latter is carried by a shaft 23, Fig. 3 and 4, which protrudes from the rear of the shutter organization, passing through aligned bores 3a and 7b provided respectively in the shutter housing 3 and the cover plate 7. At its rearmost free end the shaft 23 has a driver pin 43 for the purpose of effecting a driving connection. By having the shaft 23 protrude from the shutter housing 3 it is possible to couple the ring 19 of the shutter with actuation members carried by the camera in a simple way and one enabling a quick assembly. If, as illustrated herein, the shaft 23 protrudes from the rear of the shutter housing 3, there is the further advantage that no space is required beyond the circumference of the shutter, in order to effect the said driving connection.

In the case where interchangeable lens assemblies having fast and slow lenses are to be used with the same shutter organization, the diaphragm operators of such assemblies will have different extents of movement. In adapting such assemblies for use with the actuation ring 19 and the diaphragm setting ring 14, the preesnt invention provides an organization wherein the actuation ring 19 may travel a maximum extent required to accommodate the lens assembly having the fastest lens. The invention also arranges the coupling portions or lugs of the diaphragm operators of lens assemblies having slower lenses so as to have spaced shoulders, as provided by a stepped edge, one of such shoulders being engageable with the actuation ring and the other with the diaphragm setting or transmission ring. Thus, the different extents of travel of diaphragm operators in different lens assemblies may be coordinated to the predetermined maximum extent of movement of the actuation ring 19 and the independently moveable transmission ring 14.

The stepped construction of the coupling portions or lugs is illustrated by way of example in Figs. 5, 6 and 7. In these figures, the diaphragm operators or coupling arms of the diaphragm mechanisms of three lens assemblies are indicated at 24, 25 and 26. The fastest lens assembly is shown in Fig. 5, having a ratio of 1:2.0; the third lens assembly shown in Fig. 7 has a ratio of 1:4. The springs 27 shown in these figures as connected with the diaphragm operators tend to shift the diaphragms so as to effect the smallest openings thereof, in the present case openings having the value 22. The springs are connected between the coupling arms 24, 25 or 26 and fixed posts 28 on the lens assemblies. Furthermore, the lens assemblies have stops 29 and 30, engageable with the coupling arm 24, 25 and 26. In all of the lens assemblies, the stops 29 and 30 are spaced apart the same distance from each other, corresponding to the largest movement of the diaphragm contained in the lens assembly having the fastest lens, plus the width of the coupling arm which cooperates with the actuation ring 19. The extent of movement of the ring 19 corresponds to the movement of the coupling arm in the lens assembly having the fastest lens. In Fig. 5, this extent of movement is indicated at "s."

As above mentioned, to compensate for the different extents of movement of the diaphragm mechanics where lens assemblies having fast and slow lenses are used, the coupling portions or arms 25 and 26 are provided with spaced shoulders 25a, 25b, and 26a, 26b as effected by a stepped surface of such arms. The shoulders 25a, 25b and 26a, 26b cooperate respectively with the actuation ring 19 and the transmission ring 14, or more particularly with the lugs 19a and 14a of such rings.

Considering Figs. 5–7 the organization is such that, using the coupling portion or arm 25 of a lens having a ratio of 1:2.8 the distance between the surface 25a and the surface 25b is equivalent to the distance of a diaphragm step on the diaphragm scale 31. Considering the coupling arm or portion 26, where the lens has a ratio of 1:4 the distance between the shoulders 26a and 26b is equivalent to two diaphragm steps.

It is now evident that, with a simple organization involving a special shape of the coupling portions of the diaphragm operators in the lens assemblies, which shape does not involve additional expense, the extent of movement of the actuation ring 19 and the different extents of movement of the diaphragm operators 24, 25 and 26 have been correlated with each other. In this connection, it is especially advantageous to arrange the ring 19 axially behind the transmission ring 14. By such organization the coupling portions or arms 24, 25 and 26 can be made most effectively to cooperate with the lugs 19a and 14a.

The present invention is of great importance in cameras where the shutters must be opened to view the subject through the picture taking lens, so as to effect a proper focusing. In order to obtain a very simple actuation of the camera, requiring the fewest possible operations, it is advantageous to have simultaneous actuation of the shutter opening device (which is independent of the shutter drive) and the actuation member or ring 19 which opens the diaphragm.

In the illustrated embodiment of the invention, at the rear of the shutter base plate 4a ring 32 (Figs. 1 and 3) is arranged to be concentric with the actuation ring 19. The ring 32 serves to open the shutter blades independently of the shutter drive mechanism, and may carry in a well-known manner not shown the bearing spindles of the shutter blades. To effect a simultaneous actuation of the rings 19 and 32 when opening the diaphragm, an arm 32a is provided on the ring 32, extending axially therefrom and adapted to engage an arm 19c (Figs. 1 and 4) provided on the actuation ring 19. The arm 32a extends through a recess 3b provided at the inner circumference of the side wall of the shutter housing 3, said arm also passing through a slot 7c (Fig. 4) in the shutter cover plate 7. The improved diaphragm and shutter actuating means of the present invention as above set forth is seen to be extremely simple, compact and saving of space, and to be inexpensive to produce.

Operation of the camera illustrated herein is as follows:

Turning of the shaft 23, which may for example be effected in response to actuation of a film winding device, results in driving the actuation ring 19 counterclockwise as viewed in Fig. 4.

The shoulder 19a of the ring 19 engages and drives ahead of it the coupling arm 17 of the diaphragm assembly, thus operating the diaphragm mechanism against the action of its spring and causing the diaphragm opening to become a maximum (provided that it has not been previously adjusted to such maximum). At the same time, the arm 19c drives ahead of it the arm 32a of the ring 32, from the full line position shown in Fig. 4 to the dotted line position, to effect an opening of the shutter independently of the shutter drive mechanism.

In addition, by turning the distance setting ring 33 on the lens assembly 8, the focusing can be exactly adjusted to the subject which is to be photographed. By means of a fixed index mark 34 on the bayonet barrel 10, the adjusted distance can be read off from a distance scale 35 carried by the ring 33. To ascertain the depth of field coordinated to the diaphragm for the distance adjusted, a well-known depth of field scale 36 is provided on the barrel 10.

To keep the actuation ring 19 in a position corresponding to the open position of the diaphragm and shutter, a lock (not shown) may be arranged, to be automatically released in response to the actuation of the shutter release.

After the actuation ring 19 has been freed, it returns to its starting position under the action of a spiral spring 44 arranged at the gear 22. Thus, the arms 32a and 17, which are connected respectively with the shutter ring 32 and the diaphragm mechanism are freed, so that the shutter blades will be closed by the action of a well-known closing spring (not drawn) and the diaphragm mechanism closed to the value preset at the transmission ring 14 by virtue of the spring 27. The diaphragm value is now indicated by means of a diaphragm scale 37, Fig. 1, which cooperates with a fixed index mark 42 already mentioned. Also, the ring 14 is provided with an exposure value scale 38, referrable to an index mark 39 provided on the speed setting ring 13.

I claim:

1. In a photographic camera, a shutter housing at the front of the camera; an interchangeable lens assembly having a diaphragm; means detachably mounting said lens assembly on the front of the shutter housing; a diaphragm operator on said lens assembly, having solely one coupling portion constituted as a unitary member disposed at the rear of the lens assembly and having spring means urging said operator to a position which effects the smallest diaphragm aperture; a setting ring separate from the lens assembly and disposed on the shutter housing, said ring having a stop which is cooperable when the lens assembly is mounted on the said housing with said single coupling portion for driving the latter; and an actuation member separate from the lens assembly and disposed on the shutter housing, said member having means which are engageable, when the lens assembly is mounted on the said housing, with said single coupling portion to drive the same and open the diaphragm independently of said setting ring.

2. The invention as defined in claim 1, in which the actuation member comprises a ring which is concentric with the setting ring.

3. The invention as defined in claim 2, in which the actuation member is disposed axially behind the setting ring.

4. The invention as defined in claim 3, in which the detachable mounting means comprises an annular member, in which there is a concentric cover plate on the shutter housing, and in which the actuation ring is disposed between the said annular member and cover plate.

5. The invention as defined in claim 2, in which there is means including a gear train engaged with the actuation ring to drive the latter.

6. The invention as defined in claim 5 in which the detachable mounting means comprises an annular member, in which there is a concentric cover plate on the shutter housing, and in which the gear train is disposed between the said annular member and cover plate, said annular member being carried by the said shutter housing.

7. The invention as defined in claim 6 in which there is a shaft connected to said gear train, said shaft protruding from the shutter housing.

8. The invention as defined in claim 1, in which the actuation member comprises a turnable ring having a predetermined extent of travel equal to the maximum required for the fastest lens assembly, in which the said interchangeable lens assembly is slower than the fastest assembly, and in which the said coupling portion has spaced surfaces engageable respectively with said stop and with said means on the actuation ring.

9. The invention as defined in claim 1, in which there is means for opening the shutter independently of the shutter drive, said means being connected to the actuation member for simultaneous movement therewith.

10. The invention as defined in claim 9, in which the actuation member is a ring, and in which the means for opening the shutter independently comprises a ring concentric with the actuation ring and having an arm extending axially therefrom, said actuation ring having an arm engageable with said first-mentioned arm and driving the latter ahead of it when the actuation ring opens the diaphragm.

11. Photographic camera, having a housing at the front of the camera; an interchangeable lens assembly; means detachably mounting said lens assembly on the front of the camera housing; a diaphragm operator on said lens assembly, having solely one coupling portion constituted as a unitary member disposed at the rear of the lens assembly and having spring means urging said operator to a position which effects the smallest diaphragm aperture; a setting ring separate from the lens assembly and disposed on the camera housing, said ring having a stop which is cooperable, when the lens assembly is mounted on the said housing, with said single coupling portion for driving the latter; a releasable notch device for holding said setting ring in different selected positions; and an actuation member separate from the lens assembly and disposed on the camera housing, said member having means which are engageable, when the lens assembly is mounted on the said housing, with said single coupling portion to drive the same and open the diaphragm independently of said setting ring.

12. A photographic camera, having a housing at the front of the camera; a lens assembly having a built-in diaphragm and being mounted on the front of the camera housing; a diaphragm operator on said lens assembly, having solely one coupling portion constituted as a unitary member disposed at the rear of the lens assembly and having spring means urging said operator to a position which effects the smallest diaphragm aperture; a setting ring separate from the lens assembly and disposed on the camera housing, said ring being concentric with said lens assembly, and having a stop which is cooperable, when the lens assembly is mounted on the said housing with said single coupling portion for driving the latter; a releasable notch device for holding said setting ring in different selected positions; and an actuation ring on the camera housing, being concentric with said setting ring and having means engageable with said coupling portion to drive the same and open the diaphragm independently of said setting ring.

13. In a photographic camera, a shutter housing; an interchangeable lens assembly having a diaphragm; means detachably mounting said lens assembly on the shutter housing; a diaphragm operator on said lens assembly, having a coupling portion and spring means urging said operator to a position which effects the smallest diaphragm aperture; a setting ring on the shutter housing, having a stop cooperable with said coupling portion for driving the latter; a speed setting member on the shutter housing; a releasable coupling between said setting ring and speed setting member; and an actuation member separate from the lens assembly and disposed on the shutter housing, said member having means engageable when the lens assembly is mounted on the said housing, with said single coupling portion to drive the same and open the diaphragm independently of said setting ring.

References Cited in the file of this patent
UNITED STATES PATENTS

| | | |
|---|---|---|
| 2,340,573 | Aiken | Feb. 1, 1944 |
| 2,580,324 | Schwarz | Dec. 25, 1951 |
| 2,701,992 | Gorey | Feb. 15, 1955 |
| 2,716,930 | Marson | Sept. 6, 1955 |
| 2,777,371 | Schutz | Jan. 24, 1957 |

FOREIGN PATENTS

| | | |
|---|---|---|
| 1,106,716 | France | Dec. 22, 1955 |
| 310,855 | Switzerland | Jan. 14, 1956 |